(12) United States Patent
Narula et al.

(10) Patent No.: US 6,684,462 B1
(45) Date of Patent: Feb. 3, 2004

(54) TYING FASTENER

(76) Inventors: Dipak Narula, 910 Cherokee Rd., Louisville, KY (US) 40204; Vinod Narula, 9805 Silky Dogwood Ct., Louisville, KY (US) 40241

( * ) Notice: Subject to any disclaimer, the term of this patent is extended or adjusted under 35 U.S.C. 154(b) by 0 days.

(21) Appl. No.: 10/166,558

(22) Filed: Jun. 10, 2002

(51) Int. Cl.$^7$ ............................................. A44B 21/00
(52) U.S. Cl. .................. 24/129 R; 24/115 R; 24/712.6; 24/493
(58) Field of Search ............................ 24/115 R, 129 R, 24/132 R, 457, 339, 492, 493, 265 EC, 712.6, 297, 265 CD, 265 BC, 3.11–3.13; 248/447.1; 16/431, 235

(56) References Cited

U.S. PATENT DOCUMENTS

| | | | | |
|---|---|---|---|---|
| 3,912,140 A | * | 10/1975 | Franges | 294/166 |
| 3,963,855 A | * | 6/1976 | Hawkins et al. | 174/40 R |
| 4,038,726 A | * | 8/1977 | Takabayashi | 24/198 |
| 4,659,000 A | * | 4/1987 | Sales et al. | 224/666 |
| 4,669,156 A | * | 6/1987 | Guido et al. | 24/336 |
| 5,568,951 A | * | 10/1996 | Morgan | 292/307 A |
| 5,577,395 A | * | 11/1996 | Kuykendall | 63/3 |
| 5,669,119 A | * | 9/1997 | Seron | 24/265 H |
| 5,706,560 A | * | 1/1998 | Anscher et al. | 24/543 |
| 5,829,105 A | * | 11/1998 | Matoba et al. | 24/115 F |
| 5,957,968 A | * | 9/1999 | Belden et al. | 607/126 |
| 5,979,095 A | * | 11/1999 | Schneider et al. | 40/633 |
| 6,260,246 B1 | * | 7/2001 | Lampkins | 24/712.1 |
| 6,510,592 B1 | * | 1/2003 | Hamilton | 24/170 |

FOREIGN PATENT DOCUMENTS

JP 05-305961 * 11/1993

* cited by examiner

Primary Examiner—Anthony Knight
Assistant Examiner—André L. Jackson
(74) Attorney, Agent, or Firm—James E. Cole; Middleton Reutlinger

(57) ABSTRACT

A tying system that quickly and easily secures together ends of ropes, straps or cords is provided. The tying system has a base member and two holding members attached to different sides of the base member by first and second hinges. The tying system has opposing retention surfaces positioned on the base or holding members so that when the holding members are folded back onto each other as permitted by the hinges, two retention regions are created that tightly grip and hold the rope, strap or cord in place. The tying system is adaptable for many different sizes and dimensions of ropes, straps or cords and may be designed to grip and hold permanently or releasably.

25 Claims, 12 Drawing Sheets

TYING FASTENER

FIELD OF THE INVENTION

This invention relates, generally, to devices that fasten together ropes, straps or cords. More particularly, it relates to a device that joins together ropes, straps or cords and releases the same easier and quicker than knots and also holds with greater force than knots.

BACKGROUND OF THE INVENTION

Traditionally, in order to bundle items or secure a package some form of rope, strap or cord is wrapped tightly around the object or objects and tied with a knot. This process is time consuming and unreliable, since unless tied with precision, a knot may slip loose. Further, few people have the advanced skills required to tie the type of knots that will successfully secure an object for extended periods of handling or shipping.

Many devices have been developed in order to secure items with ropes, straps or cords that overcome the difficulties and inadequacies of a tied knot. For example, twist ties are thin flexible metal strands wrapped in paper or plastic. The ends can be wrapped around each other with a twist and secured without the use of a knot. Twist ties of sufficient length can be used to secure a package or bundle items. However, due to the flexibility of the metal, the ends will not hold together if force is applied to separate the linkage.

Wire or cable ties are made of nylon or other plastics and have a length of strapping that has ratchet teeth on one side. The tie is passed around the object or objects to be secured and one end is passed through on opening in the opposite end. Within the opening is a pawl or detent that engages the ratchet teeth on the strapping and prevents movement of the strap in the opposite or loosening direction. This mechanism effectively locks the tie in a tight position and secures the object(s). Cable ties are an improvement over twist ties in that they hold the bundled object more securely than does a twist tie. However, since cable ties often can only be tightened and not loosened, they must be cut free to unbundle the object. As such, cable ties are usually single use only.

Another alternative is to use a fastening device separate from a cord or strap. The fastening device may simply be an adhesive such as an epoxy or even heat meldable strapping. Advantageously, the cord or strap may be of numerous variations in size and material as needed because the fastening device may be designed to fit any particular need. However, often the fastening device requires special tools to apply it to the strap. Equal difficulty arises unfastening the cord or strap.

The above described developments are improvements over knots for securing ropes, straps or cords, but each have deficiencies. Therefore, there is a need for a device for securing ropes, straps, cords and the like that is easier and quicker to use than knots and existing attachment devices. Also, there is a need for an inexpensive device that has an easily adaptable design for a variety of applications and that may be reused if so desired.

SUMMARY OF THE INVENTION

It is accordingly a primary object of the present invention to provide a structure that securely grasps and holds ropes, straps or cords together essentially as does a knot but with greater securing ease and holding strength.

More particularly, it is an object of the present invention to provide a device of unitary construction having a base member and two holding members attached by hinges to the base member. The base and holding members have retention surfaces that are positioned so that when the retention surfaces are brought in contact by folding the base members toward each other at the hinges, a rope or similar item is securely clamped between the two retention surfaces. A clasp or clasps secures the two retention surfaces in close contact. Another rope or similar item or another portion of the same rope is likewise securely clamped between two other retention surfaces formed from folding base members together by way of a second hinge. When both retention areas are in use a sandwich of base-rope-base-rope-base is created.

Further, it is an object of the present invention to provide a variety of devices utilizing the same basic design parameters but with variations in the clasps, retention surfaces and hinge angles, as well as physical dimensions, in order to provide securing mechanisms for a variety of different types of ropes, straps, cords and the like.

Another object of the present invention is to provide devices that either permanently clamp a rope, strap or cord upon fastening the clasp, or releasably clamp a rope, strap or cord, depending upon the needs of the user without the requirement of special tools to facilitate the clamping.

BRIEF DESCRIPTION OF THE DRAWINGS

A better understanding of the invention will be had upon reference to the following description in conjunction with the accompanying drawings in which like numerals refer to like parts throughout the several views and wherein.

DETAILED DESCRIPTION OF THE PREFFERED EMBODIMENT

Figure 1:
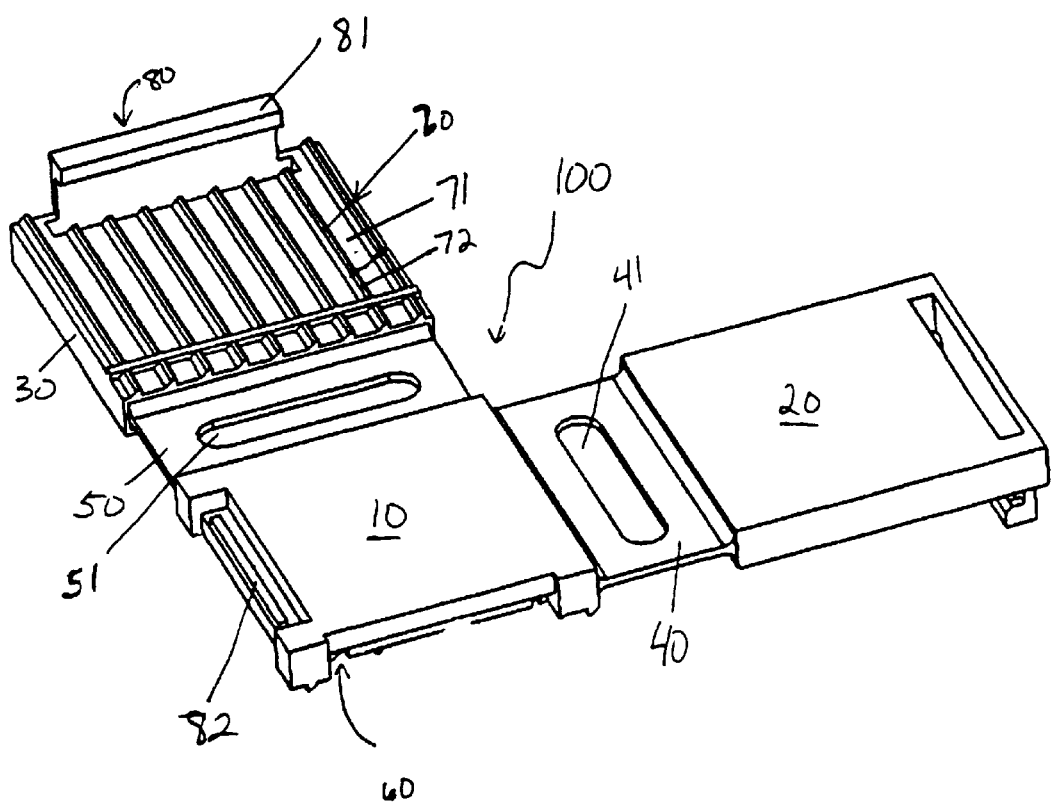
FIG. 1 is a perspective view of an illustrative embodiment of the novel tying structure of the present invention showing the structure in its open configuration.
Figure 11:
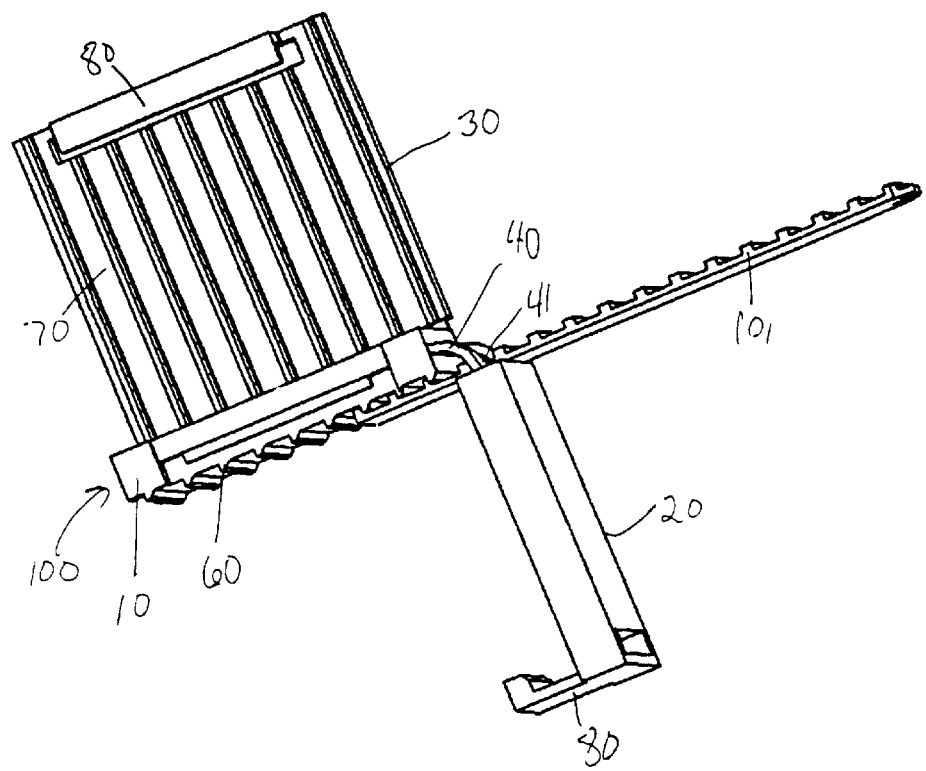
FIG. 11 is a perspective view of the structure of FIG. 1 showing the structure folding to a closed position.

One embodiment of the present invention is a strap tie 100 of unitary construction as shown in FIG. 1. Strap tie 1 includes base member 10 that may be a square or rectangular wafer in appearance. On one of either a top or bottom face of the base member 10 is a first retention surface 60 (FIG. 11). Attached to two of the sides of base member 10 are first holding member 20 and second holding member 30. First holding member 20 and second holding member 30 are attached to base member 10 by first hinge 40 and second hinge 50, respectively. First hinge 40 and second hinge 50 may either or both have a strap opening, here labeled first strap opening 41 and second strap opening 51, respectively. Strap openings 41 and 51 allow passage of the strap to be secured through hinge 40 or 50, respectively, after it is secured. The base member 10 and holding members 20 and 30 provide a platform for retention surfaces 60 and 70.

Holding members 20 and 30 hingedly attached to base member 10 by hinges 40 and 50, respectively, may be positioned at 90° or 180° angles relative to each other depending on the needs of the user. That is, holding members 20 and 30 may be hingedly attached to either adjacent or opposing sides of base member as need dictates. In the embodiment of the present invention disclosed in FIG. 1, the holding members 20 and 30 are arranged at 90° angles relative to each other. For this particular embodiment, this arrangement may be preferable for certain applications in that it positions the second holding member 30 (the last member to be closed) ergonomically for greatest ease of closure. Other embodiments and uses may have an ergonomic advantage to having holding members 20 and 30 positioned at 180° angles relative to each other.

A second retention surface 70 may be located on a face of either the first holding member 20 or the second holding member 30, or it may be on the face opposite of the first retention surface 60 on the base member 10. In the embodiment shown in FIG. 1, the retention surfaces 60 and 70 are designed to lock a strap in place. Second retention surface 70 is shown clearly in FIG. 1. Second retention surface 70 has a flat base 71 and ridges 72 raised above the flat base 71. The ridges 72 run along the length of retention surfaces 60 and 70, parallel to each other and perpendicular to the strap length. The ridges 72 provide an uneven surface that increases the gripping capability on the strap of the retention surfaces 60 and 70.

Figure 12:
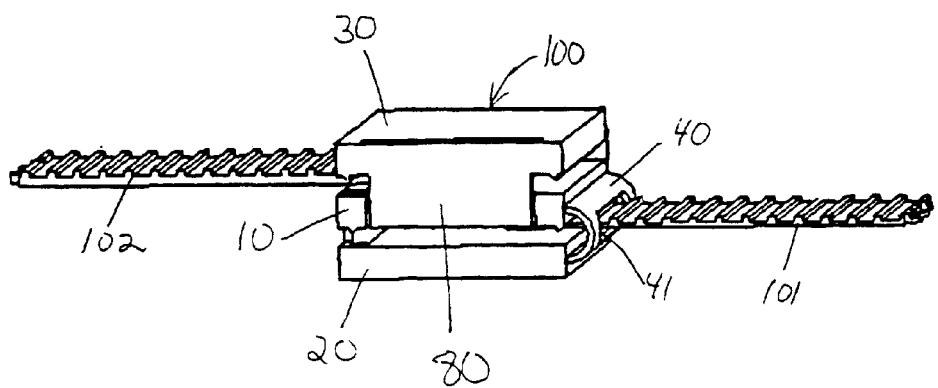
FIG. 12 is a perspective view of the structure of FIG. 1 in a closed position with strap ends securely fastened by the tie.

First holding member 20 and second holding member 30 can each be folded at first hinge 40 and second hinge 50, respectively, onto opposite faces of base member 10 in order to position the strap tie 100 in its closed position. FIG. 11 shows a first strap end 101 passing through first strap opening 41 and aligning with first retention surface 60. First holding member 20 is folding at first hinge 40 around first strap end 101. FIG. 12 shows an embodiment of the present invention in its closed position. The strap tie 100 may be held in its closed position by one or more clasps 80 located on each of the holding members 20 and 30 or on the base member 10. FIG. 12 shows tie 100 completely closed by two clasps 80. A second strap end 102 is retained by a retention surface on second holding member 30. Strap ends 101 and 102 may be two ends of the same strap or ends from separate straps. Thus, the tie 100 may be used to tie a strap that is bundling objects together or as a joining means for different straps.

Figure 2:
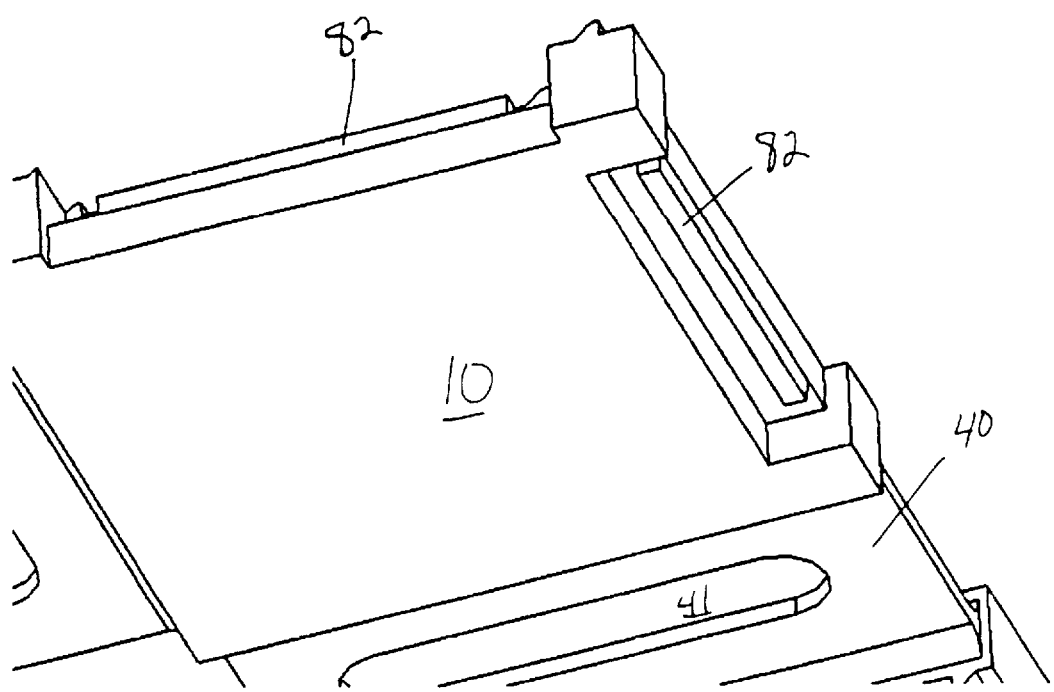
FIG. 2 is a detail view of the structure of FIG. 1 showing the base member and clasp detent.

In one embodiment of the invention as set forth in FIG. 1, a clasp 80 is located on the end farthest from hinge 40 of each holding member 20 and 30. A retention hook 81 on the distal end of clasp 80 lockingly engages a clasp detent 82 on main base member 10 when the strap tie 1 is in its closed position. FIG. 2 illustrates in detail the positioning and architecture of the clasp detent 82. The locking engagement may be permanent. Alternatively, the clasp 80 may be flexible enough so that retention hook 81 can be biased away from clasp detent 82 enough to unlock and open the strap tie 1, thus making the strap tie 1 adjustable and reusable after initial locking.

Alternative embodiments of the present invention are possible without deviating from the spirit of the invention. Depending upon need, these embodiments may include variations in the retention surfaces to accommodate a variety of different ropes, straps or cords. Also, different clasps may be used according to the application needs, such as the ease of closure versus the need for a tighter hold or permanent versus releasable clasps. Finally, the angle of the holding members 20 and 30 relative to each other may vary depending on user needs. Several of the alternative embodiments falling within the scope of the invention are discussed following and disclosed in the remaining figures.

Figure 3:
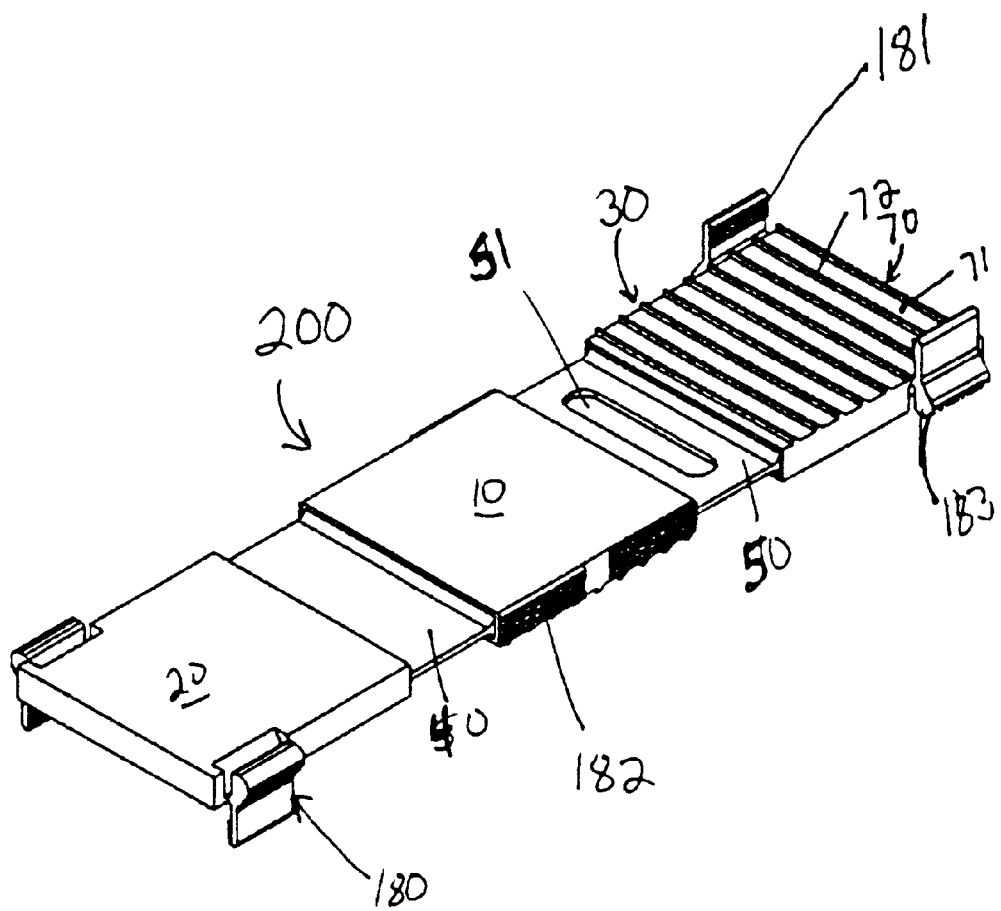
FIG. 3 is a perspective view of another embodiment of the novel tying structure of the present invention in its open configuration.

FIG. 3 shows an embodiment of the present invention for securing straps. The strap tie 200 has the same general design as previously discussed with some different embodiments suited for specific purposes. The holding members 20 and 30 are connected to the base member 10 by hinges 40 and 50 at an angle relative to each other of 180°. Hinge 50 has a strap opening 51 which permits passage of a strap therethrough.

The retention mechanism can be the same as previously discussed. Namely, retention surfaces 60 and 70 have a flat base 71 and ridges 72 raised above the flat base 71. The ridges 72 run along the length of retention surfaces 60 and 70, parallel to each other and perpendicular to the strap length. The ridges 72 provide an uneven surface that increases the gripping capability on the strap of the retention surfaces 60 and 70. The strap ends retained may have ridges that mate with ridges 72 as illustrated in FIGS. 11 and 12, or the straps may have a flat surface. Either type of strap is retained well by the retention mechanism described.

Figure 4:
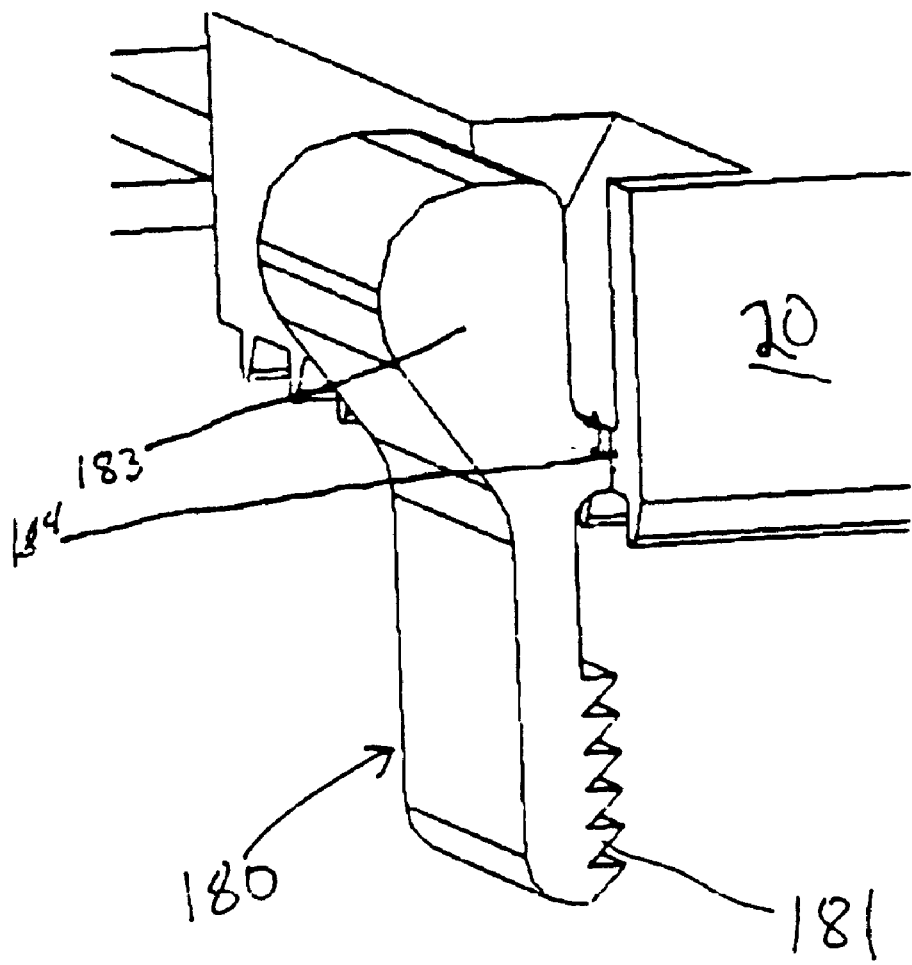
FIG. 4 is a detail view of the structure of FIG. 3 showing one embodiment of a clasp.

The clasps 180 are constructed to be releasable. Two clasps are positioned on either side of both holding members 20 and 30. As shown in detail in FIG. 4, each clasp 180 has gripping teeth 181 at one end of the clasp 180 and a pressure projection 183 at the opposite end with a pivoting hinge 184 between. Upon rotation of holding members 20 and 30 to the closed position, gripping teeth 181 on clasp 180 lockingly engage mated locking grooves 182 on the side of base member 10. This results in the tight clasping of the inserted strap or straps. If the user wishes to release the strap or straps, application of pressure to the pressure projection 183 by the user biases the gripping teeth 181 away from the locking grooves 182, thus opening the strap tie 200 and releasing the strap.

Figure 5:
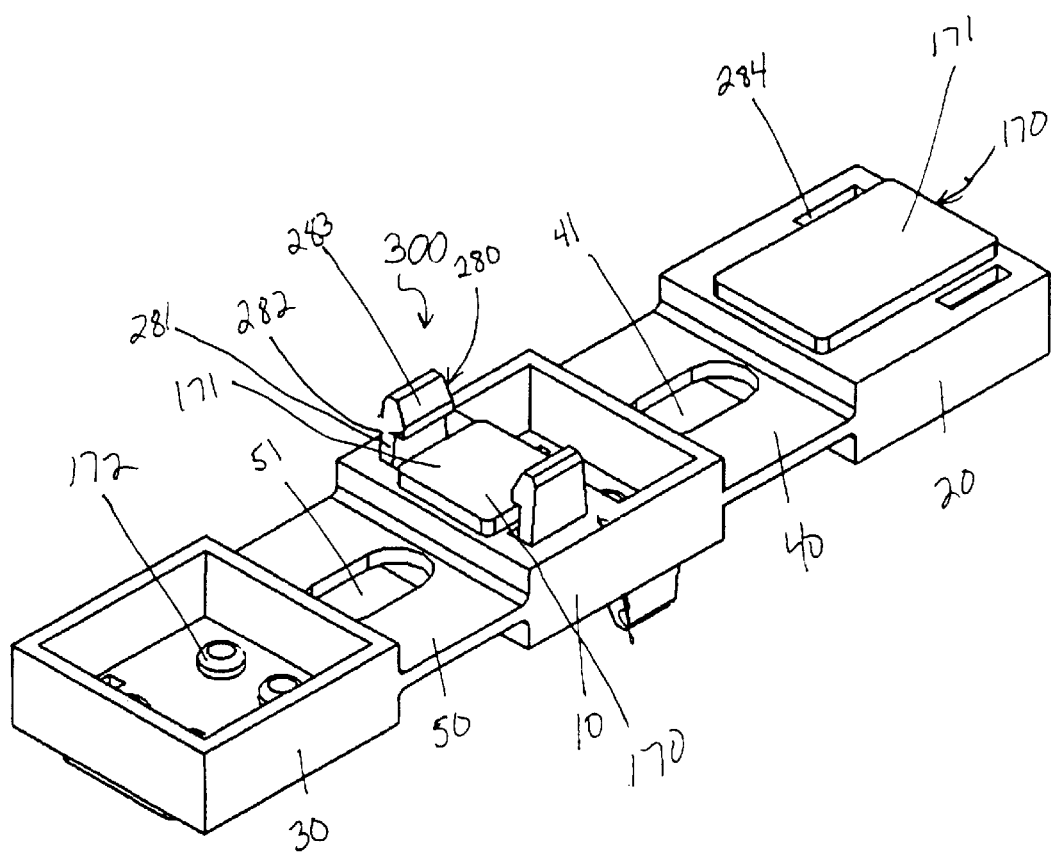
FIG. 5 is a perspective view of another embodiment of the novel tying structure of the present invention in its open configuration.

Turning now to FIG. 5, another embodiment of the invention for securing ropes, cords or straps is shown. Compression tie 300 shares with the other embodiments discussed two holding members 20 and 30 attached by hinges 40 and 50, respectively, to base member 10. Hinges 40 and 50 may have openings 41 and 51, respectively, for allowing passage of the article to be tied therethrough. The shape of the openings 41 and 51 may be varied so as to accommodate the dimensions of the article passing through. In this particular embodiment, the openings 41 and 51 are shaped so as to permit passage of an article with a circular cross-section therethrough.

The embodiment shown in FIG. 5 has retention surfaces 170 on both top and bottom faces of all the base members 10, 20 and 30. The retention surfaces 170 for this embodiment are comprised of a retention plate 171 affixed to the face of the base member 10, 20 or 30. The retention plate 171 may be affixed to the base member 10, 20 or 30 by any of a number of means as is known in the art such as by a fixative or fastener. Fixatives may include glues, cements, welds and other fixatives as is generally known in the art. Fasteners include screws, nails, bolts, rivets and other fasteners as is generally known in the art. In FIG. 5, retention plate 171 is affixed by means of a rivet 172. Retention plate 171 grips the article to be affixed by compression forces when two of the base members 10, 20 or 30 with retention surfaces are brought into contact and locked in place. Retention plate 171 may have a smooth surface, or it may be textured so as to increase its holding strength through friction between its roughened surface and the article to be secured. Although this means of retaining may work most effectively with flattened articles such as straps that have large surface areas in contact with the retention surface 170, it may perform equally well with more rounded articles if the articles are compressible or the clamping force is sufficiently great enough.

The embodiment of FIG. 5 utilizes a clasp 280 that permanently and tightly holds the tie 300 in its closed and locked position when engaged. Clasp 280 is attached to base member 10 by a flexing arm 281 that projects from base member 10 and ends in a locking hook 282 and angled biasing face 283. As the tie 300 is folded into its closed and locked position, a mated recess 284 in one of the holding members 20 or 30 receives clasp 280. As the clasp 280 enters the recess 284, angled biasing face 283 biases flexing arm 281 backward until the locking hook 282 lockingly engages the peripheral wall of the recess 284. With the influence of the angled biasing face 283 removed, the flexing arm 281 returns to its unbiased state, therefore permanently locking the clasp 280 within the recess 284. In turn, this permanently clasps the item to be retained within the closed tie 3.

Figure 6:
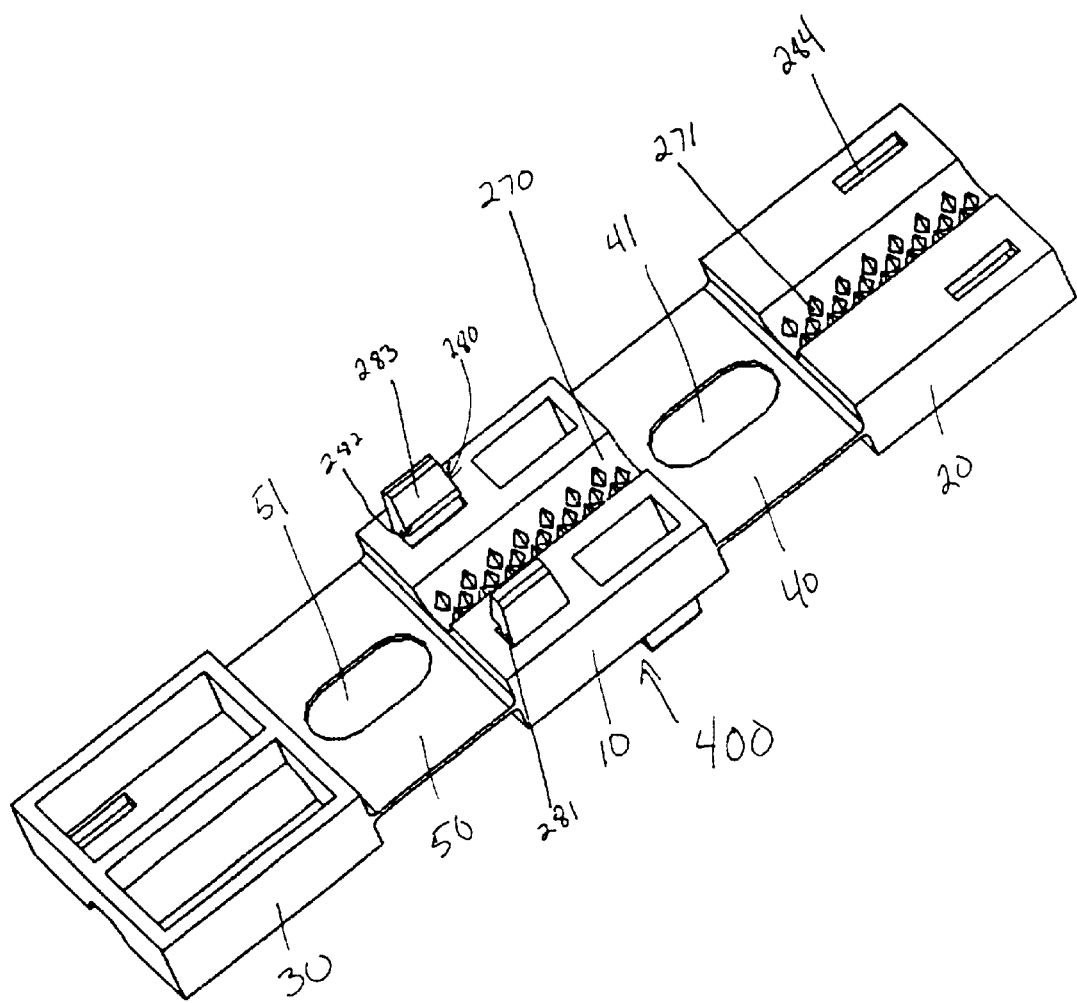
FIG. 6 is a perspective view of another embodiment of the novel tying structure of the present invention in its open configuration.

FIG. 6 illustrates an embodiment of the present invention particularly suited for grasping and retaining ropes or cords. Rope tie 400 shares with the other embodiments discussed two holding members 20 and 30 attached by hinges 40 and 50, respectively, to base member 10. Hinges 40 and 50 may have openings 41 and 51, respectively, for allowing passage of the article to be tied therethrough. The shape of the openings 41 and 51 may be varied so as to accommodate the dimensions of the article passing through. In this particular embodiment, the openings 41 and 51 are shaped so as to permit passage of an article with a circular cross-section therethrough, such as a rope, cord or the like.

The embodiment of FIG. 6 utilizes a clasp 280 that permanently and tightly holds the tie 300 in its closed and locked position when engaged. The clasp 280 is identical to the one described supra and shown in FIG. 5.

The retention surfaces of this embodiment are recessed retention channels 270 running through the base members 10, 20 or 30. When the tie 400 is in the closed position, mirror-image retention channels 270 on opposing base members 10, 20 or 30 meet and are locked together by clasps 280 and mated recesses 284 to form an ovoid or circular tube matching the dimensions of the article to be secured. The holding means for the article are varied as is generally known in the art. FIG. 6 shows a plurality of spikes 271 lining the interior of the retention channel 270 that exemplify one embodiment of the holding means.

The spikes 271 effectively penetrate into the rope or the like, grasp it and retain it in the retention channel 270 when the tie 400 is in its closed and locked position. The spikes 271 operate most effectively when the article to be retained is made from a material soft enough to permit puncture or indentation by the spikes 271. Thus, materials such as braided rope and plastic sheathed wire are retained most effectively with this embodiment.

Figure 7:
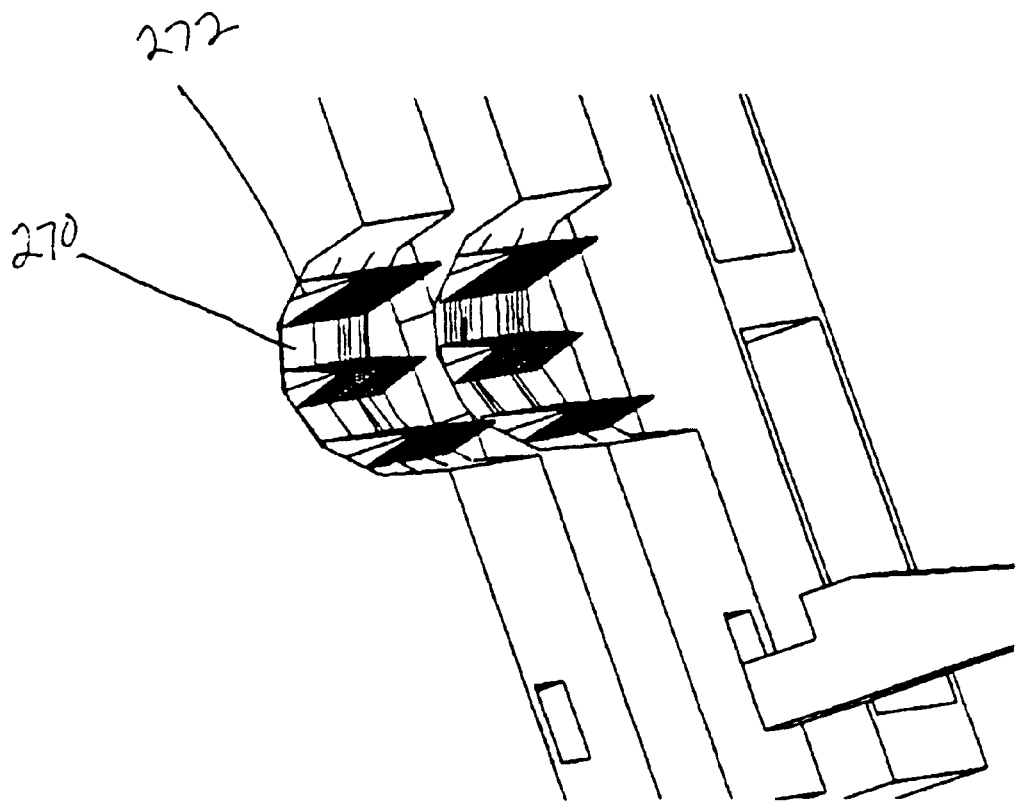
FIG. 7 is a detail view of an embodiment for a retention surface of the present invention showing a retention channel with spike ridges.

The spikes 271 may be shaped in any form that effectively penetrates the article to be retained. In FIG. 6 the spikes are pyramidal in shape, however, other geometric forms, such as cones would operate as effectively. FIG. 7 illustrates one possible alternative geometric form for the spikes 271. In FIG. 7, the spikes 271 are defined as spike ridges 272 that run in parallel lines along the length of the retention channel 270. Other equally effective embodiments fall within the scope of the present invention as well.

Figure 8:
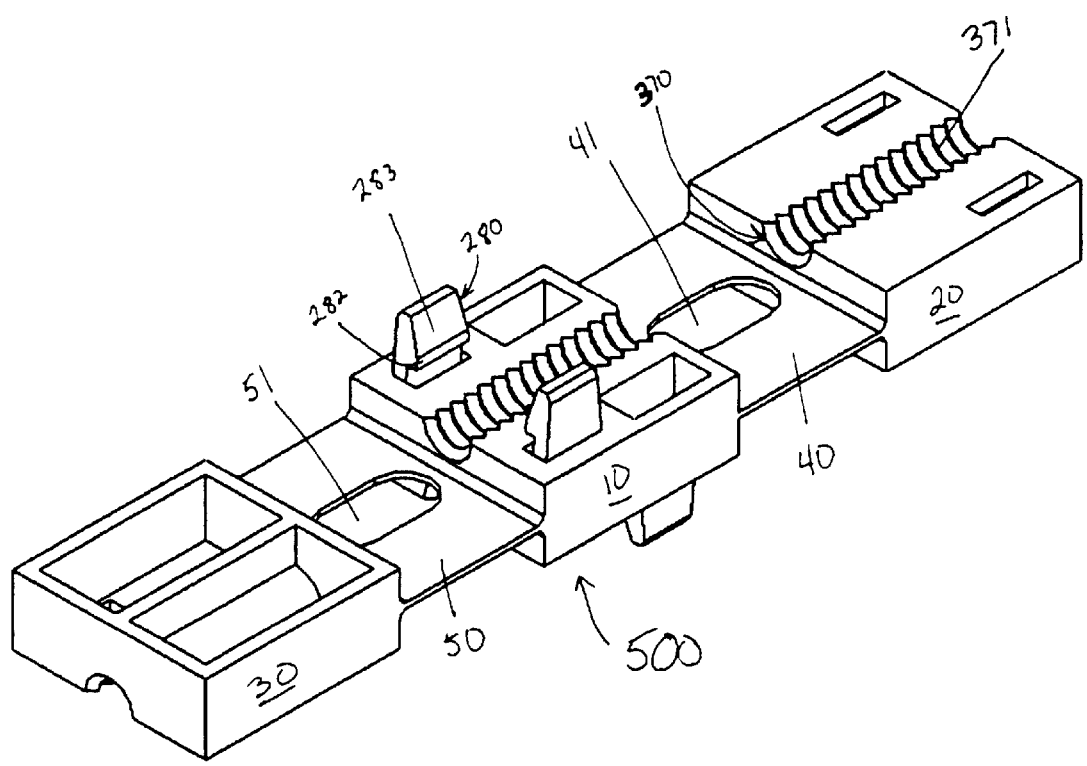
FIG. 8 is a perspective view of another embodiment of the novel tying structure of the present invention in its open configuration.

Turning now to FIG. 8, an alternative embodiment of the present invention particularly suited for grasping and retaining ropes or cords is shown. The embodiment shares many of the features of the embodiment taught supra and illustrated in FIG. 6 except for a different mechanism of action for the holding means. The retention surfaces of this embodiment are recessed retention channels 370 running the length of base and holding members 10, 20 and 30. When the rope tie 500 is in the closed position, mirror-image retention channels 270 on opposing base or holding members 10, 20 or 30 meet and are locked together by clasps 280 and mated recesses 284 to form an ovoid or circular tube matching the dimensions of the article to be secured. The means of holding the article in the embodiment illustrated in FIG. 8 are a plurality of parallel retention ridges 371 lining the retention channel 370. The retention ridges 371 are positioned perpendicular to the length of the rope or cord to be retained. The retention ridges 371 form a plurality of compression lines along the length of the article to be retained when the tie 500 is in its closed position. These multiple compression areas help to better secure the article. Of course, the placement pattern and dimensions of the retention ridges 371 may vary and still function as intended and therefore remain within the scope of the present invention.

Figure 9:
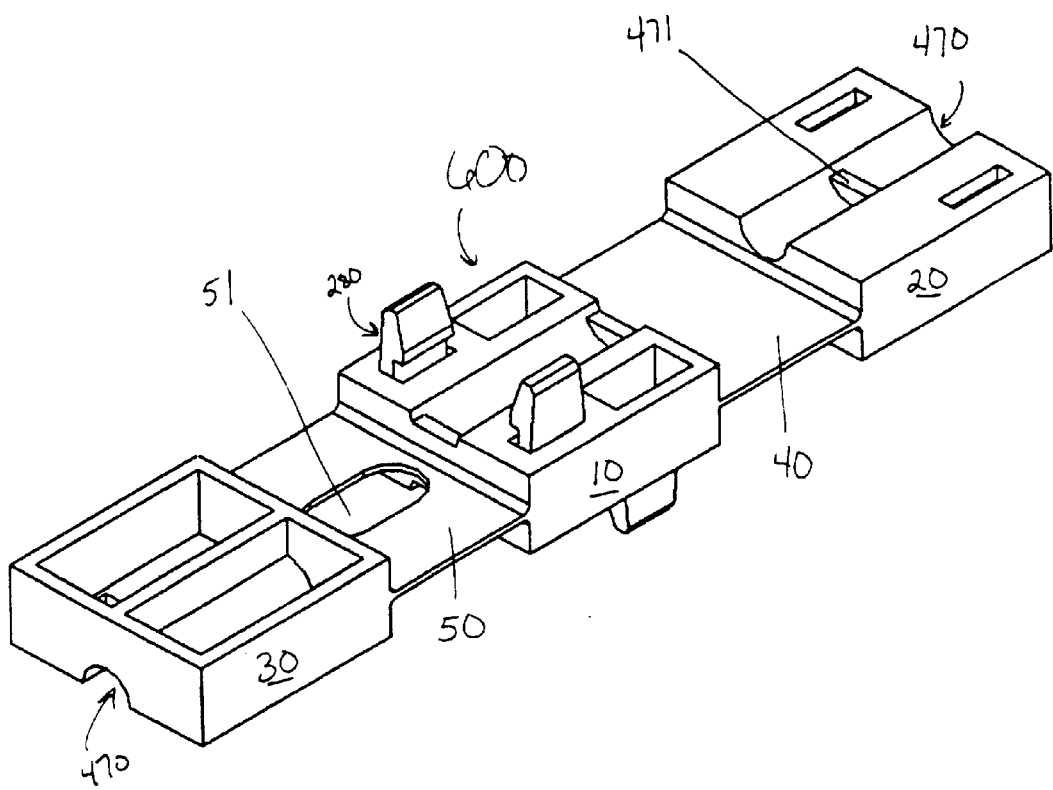
FIG. 9 is a perspective view of another embodiment of the novel tying structure of the present invention in its open configuration.

In FIG. 9, an alternative embodiment encompassing a retention channel 470 is shown. In this embodiment, rather than a plurality of retention ridges 371, multiple compression elements 471 are utilized to apply a compression force to the article to be retained. The compression elements 471 are staggered along both mirror-image retention channels 470 of base and holding members 10, 20 and 30. The compression elements 471 may not contact each other directly in the staggered configuration. Therefore, when the rope or cord to be retained is placed within the retention channel 470, and the tie 600 is in its closed position, the rope or cord is forced to assume a serpentine configuration. This keeps the rope or cord held in place by the different staggered compression elements 471, each applying a holding pressure to the rope or cord at different sites along its length.

Figure 10:
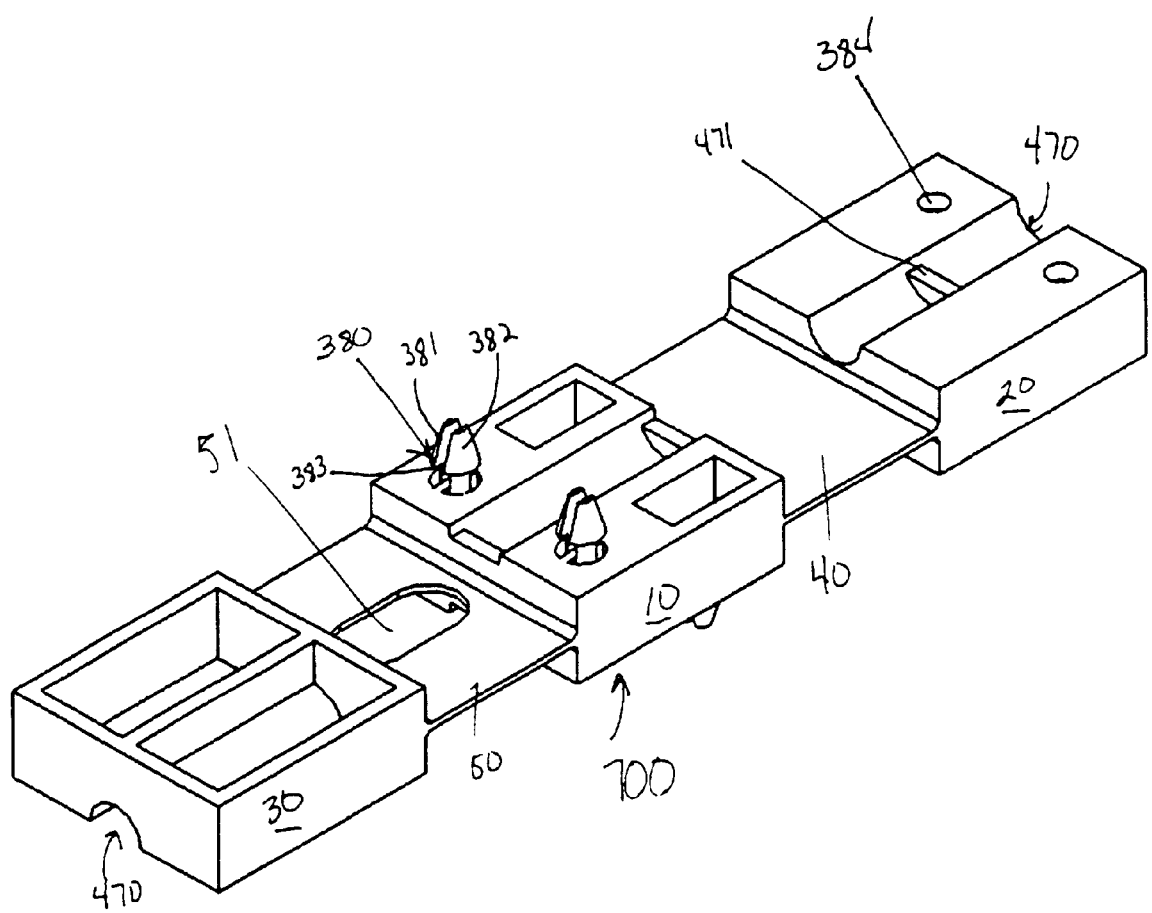
FIG. 10 is a perspective view of another embodiment of the novel tying structure of the present invention in its open configuration.

FIG. 10 shows a further embodiment of the present invention. This embodiment utilizes an alternative clasp 380 in order to permanently hold the tie 700 in its closed position. The "spike" clasp 380 is comprised of a first hemiconical biasing face 381 and an opposing mirror-image second hemiconical biasing face 382 each having a retention edge 383 along the skirt of both faces. When positioning the tie 700 into its closed position, the biasing faces 381 and 382 engage the walls of a mated retention opening 384 on the opposing base member 10, 20 or 30 forcing the overall circumference of the spike clasp 380 to reduce and permitting more of the clasp 380 to enter the retention opening 384. Once the retention ridge 383 passes through the opening 384, the clasp 380 returns to its full diameter. The clasp 380 is now permanently locked within the opening 384. Thus, the tie 700 is now permanently in its closed and locked position with the article or articles to be retained locked within the retention channel 470.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the amended claims.

What is claimed is:

1. A tying structure of unitary construction, comprising:
   a base member having an upper and a lower surface;
   a first holding member having an upper and a lower surface and hingedly affixed to said base member by a first hinge;
   a second holding member having an upper and a lower surface and hingedly affixed to said base member by a second hinge;
   at least one of said first and second hinges having a strap opening there through;
   a first clasp positioned on said first holding member to clamp said first holding member to said base member in a closed position; and
   a second clasp positioned on said first holding member to clamp said second holding member to said base member in a closed position.

2. The tying structure of claim 1, wherein said first hinge has said strap opening.

3. The tying structure of claim 1, wherein said second hinge has said strap opening.

4. The tying structure of claim 1, wherein said first and second clasps are releasable.

5. The tying structure of claim 1, wherein said first and second clasps are comprised of a retention hook that lockingly engages a clasp detent on an opposing base member.

6. The tying structure of claim 1, wherein said first and second clasps are comprised of gripping teeth positioned at one end of said clasps, a pressure projection at an opposite end and a pivoting hinge attaching said clasps to said holding member.

7. The tying structure of claim 1, wherein said first and second clasps are spike clasps.

8. The tying structure of claim 1, wherein said first and said second holding members can each be clasped in said closed position independently of the other.

9. The tying structure of claim 1, wherein said first and second clasps depend from said base member.

10. The tying structure of claim 9, wherein said first and second clasps are comprised of a flexing arm attached to and projecting from said base member, a locking hook extending from the end of said flexing arm and an angled biasing face on one side of said locking hook.

11. The tying structure of claim 1, further comprising at least one retention surface adjacent said first hinge and at least one retention surface adjacent said second hinge.

12. The tying structure of claim 11, wherein said retention surfaces are comprised of a flat base and a plurality of ridges depending upward from said flat base.

13. The tying structure of claim 12, wherein said plurality of ridges run parallel to each other.

14. The tying structure of claim 11, wherein said retention surfaces are retention plates.

15. The tying structure of claim 14, wherein said retention plates are affixed to said retention surfaces by a fastener.

16. The tying structure of claim 15, wherein said fastener is a rivet.

17. The tying structure of claim 14, wherein said retention plates are affixed to said surfaces by a fixative.

18. The tying structure of claim 11, wherein said retention surfaces are comprised of channels lined with a holding means.

19. The tying structure of claim 18, wherein the holding means is a plurality of spikes.

20. The tying structure of claim 18, wherein the holding means is a plurality of parallel ridges.

21. The tying structure of claim 18, wherein the holding means is at least one compression element.

22. A tying structure of unitary construction, comprising:
   a base member having an upper surface, a lower surface, a first side and an adjacent second side;
   a first holding member having an upper and a lower surface and hingedly affixed to said first side of said base member by a first hinge;
   a second holding member having an upper and a lower surface and hingedly affixed to said second side of said base member by a second hinge;
   at least one of said first and second hinges having at least one strap opening there through;
   a first clasp positioned on said first holding member to clamp said first holding member to said base member in a closed position; and
   a second clasp positioned on said second holding member to clamp said second holding member to said base member in a closed position.

23. The tying structure of claim 22, further comprising a first retention surface on said lower surface of said base member and a second retention surface on said upper surface of said second holding member.

24. A tying structure of unitary construction, comprising:
   a base member having an upper surface, a lower surface, a first side and an opposing second side;
   a first holding member having an upper and a lower surface and hingedly affixed to said first side of said base member by a first hinge;
   a second holding member having an upper and a lower surface and hingedly affixed to said second side of said base member by a second hinge;
   at least one of said first and second hinges having at least one strap opening there through;
   a first clasp positioned on said first holding member to clamp said first holding member to said base member in a closed position; and
   a second clasp positioned on said second holding member to clamp said second holding member to said base member in a closed position.

25. The tying structure of claim 24, further comprising a plurality of retention surfaces on said upper surface and said lower surface of said base member and on said upper surfaces and said lower surfaces of said first and said second holding members.

* * * * *